(12) United States Patent
Mori

(10) Patent No.: US 8,205,789 B2
(45) Date of Patent: Jun. 26, 2012

(54) SYSTEM AND PROCESS FOR HANDLING, PREPPING, TAGGING AND SHIPPING PLANTS

(75) Inventor: William Mori, Niagara-on-the-Lake (CA)

(73) Assignee: 842781 Ontario Inc., Niagara-On-The-Lake, Ontario (CA)

( * ) Notice: Subject to any disclaimer, the term of this patent is extended or adjusted under 35 U.S.C. 154(b) by 105 days.

(21) Appl. No.: 12/721,384

(22) Filed: Mar. 10, 2010

(65) Prior Publication Data

US 2011/0174873 A1   Jul. 21, 2011

(51) Int. Cl.
| | |
|---|---|
| G06F 17/00 | (2006.01) |
| G06F 19/00 | (2011.01) |
| G06K 7/10 | (2006.01) |
| G06K 15/00 | (2006.01) |
| G06K 7/14 | (2006.01) |
| G06K 19/00 | (2006.01) |
| G06Q 30/00 | (2012.01) |
| G06Q 90/00 | (2006.01) |
| A01C 15/00 | (2006.01) |
| A01G 9/08 | (2006.01) |
| A01G 9/02 | (2006.01) |
| B65C 11/02 | (2006.01) |

(52) U.S. Cl. ............ 235/375; 235/462.01; 235/462.13; 235/454; 235/385; 235/487; 111/200; 47/1.01 R; 47/84; 156/384

(58) Field of Classification Search ........ 111/200, 111/900, 105; 47/1.01 R, 84, 58.1 R, 17, 47/901, 66.6, 65.5; 198/804, 358, 349.5, 198/349.7; 156/64, 277, 350, 384; 235/375, 235/462.01, 385, 454, 462.13, 487
See application file for complete search history.

(56) References Cited

U.S. PATENT DOCUMENTS

| | | | | |
|---|---|---|---|---|
| 4,123,310 A | * | 10/1978 | Varon et al. | 156/351 |
| 4,289,080 A | * | 9/1981 | Penley | 111/105 |
| 4,382,332 A | * | 5/1983 | Dominge | 30/379 |
| 4,947,579 A | * | 8/1990 | Harrison et al. | 47/1.01 R |
| 4,972,616 A | * | 11/1990 | Doll | 40/645 |
| 5,040,488 A | * | 8/1991 | Hwang | 119/202 |
| 5,170,698 A | * | 12/1992 | Kirk | 99/472 |
| 6,164,537 A | * | 12/2000 | Mariani et al. | 235/383 |
| 6,179,030 B1 | * | 1/2001 | Rietheimer | 156/360 |
| 6,257,294 B1 | * | 7/2001 | Weisbeck | 156/356 |
| 6,453,613 B1 | * | 9/2002 | Gratz | 47/84 |
| 6,536,367 B1 | * | 3/2003 | Carter | 114/344 |
| 6,594,949 B2 | * | 7/2003 | Ellis | 47/1.01 P |
| 6,804,841 B1 | * | 10/2004 | Williams | 4/541.1 |
| 7,069,100 B2 | * | 6/2006 | Monette et al. | 700/116 |
| 7,403,855 B2 | * | 7/2008 | Fuessley et al. | 702/5 |

(Continued)

OTHER PUBLICATIONS http://www.ciequip.com/water_trailer-525.html, hereinafter "Cie", 1998-2007.*

(Continued)

*Primary Examiner* — Daniel Walsh
(74) *Attorney, Agent, or Firm* — Fliesler Meyer LLP

(57) ABSTRACT

A plant handling, tagging and shipping system includes a flood trailer towed by a cart for delivering potted plants from a grow site to a prepping station while also soaking the pots, an on-demand tag-printing system for printing plant tags based on customized client data, and a conveyor system that enables workers to trim, weed, clean, and tag the plants as they travel along the conveyor. This novel system and process for handling, tagging and shipping plants provides enormous efficiencies as compared with traditional processes.

12 Claims, 4 Drawing Sheets

U.S. PATENT DOCUMENTS

| | | | |
|---|---|---|---|
| 2001/0022323 A1* | 9/2001 | Aslakson | 239/172 |
| 2001/0035264 A1* | 11/2001 | Padmanabhan | 156/300 |
| 2002/0031995 A1* | 3/2002 | Melville | 452/157 |
| 2002/0121465 A1* | 9/2002 | Gannon | 209/421 |
| 2003/0066601 A1* | 4/2003 | Weder et al. | 156/297 |
| 2003/0070352 A1* | 4/2003 | Ellis | 47/1.01 P |
| 2003/0124345 A1* | 7/2003 | Faust et al. | 428/354 |
| 2003/0154901 A1* | 8/2003 | Carter | 114/344 |
| 2003/0196373 A1* | 10/2003 | Ellis | 47/1.01 P |
| 2003/0226787 A1* | 12/2003 | Buisman et al. | 209/3.3 |
| 2004/0122592 A1* | 6/2004 | Fuessley et al. | 702/2 |
| 2004/0217190 A1* | 11/2004 | Silva | 239/69 |
| 2004/0237368 A1* | 12/2004 | Paskesen et al. | 40/645 |
| 2004/0237386 A1* | 12/2004 | Madsen et al. | 47/1.01 P |
| 2005/0056435 A1* | 3/2005 | Price et al. | 169/52 |
| 2006/0117628 A1* | 6/2006 | Faulkner | 40/645 |
| 2006/0218862 A1* | 10/2006 | Dyas | 47/86 |
| 2006/0272208 A1* | 12/2006 | Altman et al. | 47/66.1 |
| 2007/0252006 A1* | 11/2007 | Heck et al. | 235/455 |
| 2009/0042180 A1* | 2/2009 | Lafferty et al. | 435/4 |
| 2010/0218900 A1* | 9/2010 | Norrby | 156/387 |
| 2011/0006111 A1* | 1/2011 | Van Zanten et al. | 235/376 |
| 2011/0174873 A1* | 7/2011 | Mori | 235/375 |

OTHER PUBLICATIONS www.codeway.com/?q=search/node/green%20machine, hereinafter "Search", Sep. 1, 2011.* www.bluhmsysteme.dk/htmldk/mccorkle.html, herinafter "Bluhm", 2006.* http://www.codeway.com/?q=content/green-machines-scan-and-label-pots-speed, hereinafter "Codeway", Jul. 17, 2009 as dated by Codeway "Search" NPL above.*

* cited by examiner

SYSTEM AND PROCESS FOR HANDLING, PREPPING, TAGGING AND SHIPPING PLANTS

CLAIM OF PRIORITY

This application claims priority under 35 U.S.C. 119(a) to Canadian Application No. 2,690,409, entitled "System and Process for Handling, Prepping, Tagging and Shipping Plants," filed Jan. 18, 2010, and which application is herein incorporated by reference.

TECHNICAL FIELD

The present invention relates generally to systems and processes for fulfilling orders for plants at nurseries, greenhouses and the like and, in particular, to systems and processes for the efficient handling, prepping, tagging and shipping of plants.

BACKGROUND

Traditionally, plant nurseries have used inefficient processes to handle, tag and ship their plants to distributors or retailers. The traditional approach usually involves the pickers receiving a paper order form indicating the customer name, plant varieties and numbers desired. Pickers with a tractor driver would usually drive to various sites and put plants on a trailer. Once the order was completed, the tractor pulled the trailer into the shipping area for unloading, watering and trimming. Watering is usually done overhead with a hose (i.e. "top watering"). The trailers full of picked pots are traditionally pulled up to the prepping area where the plants are cleaned, trimmed, weeded and then tagged with a tag that displays a photo of the plant, specs and care instructions. These tags are traditionally ordered in advance from a tag printing company. An additional sticky tag was added at the time of shipping that displayed price, bar code, UPC, customer name, etc.

Applicant has realized that the foregoing traditional process for handling, tagging and shipping plants is highly inefficient and had no checks and controls in place. Accordingly, there remains a need for simple, cost-effective solutions to the related problems of handling, prepping, tagging and shipping of plants. An integrated solution to these related problems has, until now, yet to be devised.

SUMMARY

The present invention provides a novel system and process for handling, prepping, tagging and shipping plants.

A main aspect of the present invention is a plant prepping and tagging system that comprises a conveyor for conveying plants to enable the plants to be individually prepped and a tag-printing system for printing tags on demand for affixing to the plants after prepping.

Another main aspect of the present invention is a process for handling, prepping, and tagging plants that entails receiving picked plants on a trailer, scanning bar code information associated with the picked plants into a tag-printing system, printing tags on demand using the tag-printing system, and tagging the plants with the tags.

Yet another main aspect of the present invention is a process for prepping plants that entails receiving picked plants on a trailer, loading the picked plants onto a conveyor, and prepping the plants as the plants travel along the conveyor.

Yet a further aspect of the present invention is a flood trailer for transporting plants. The trailer includes a frame having a connection joint for connecting to a cart adapted to tow the trailer, a water-retention basin supported by the frame, the water-retention basin adapted to receive a volume of water into which plants are placed for soaking, while waiting to be loaded onto the conveyor, and a water valve adapted to receive a water hose for filling the water-retention basin with water and for draining water from the water-retention basin.

BRIEF DESCRIPTION OF THE DRAWINGS

Further features and advantages of the present technology will become apparent from the following detailed description, taken in combination with the appended drawings, in which.

DETAILED DESCRIPTION

In general, and by way of overview, the present invention is a novel system and process for handling, prepping, tagging and shipping plants for use in a plant-prepping facility at a nursery, greenhouse or other such establishment where plants are grown for sale and shipment to local retailers.

Figures 1, 2:
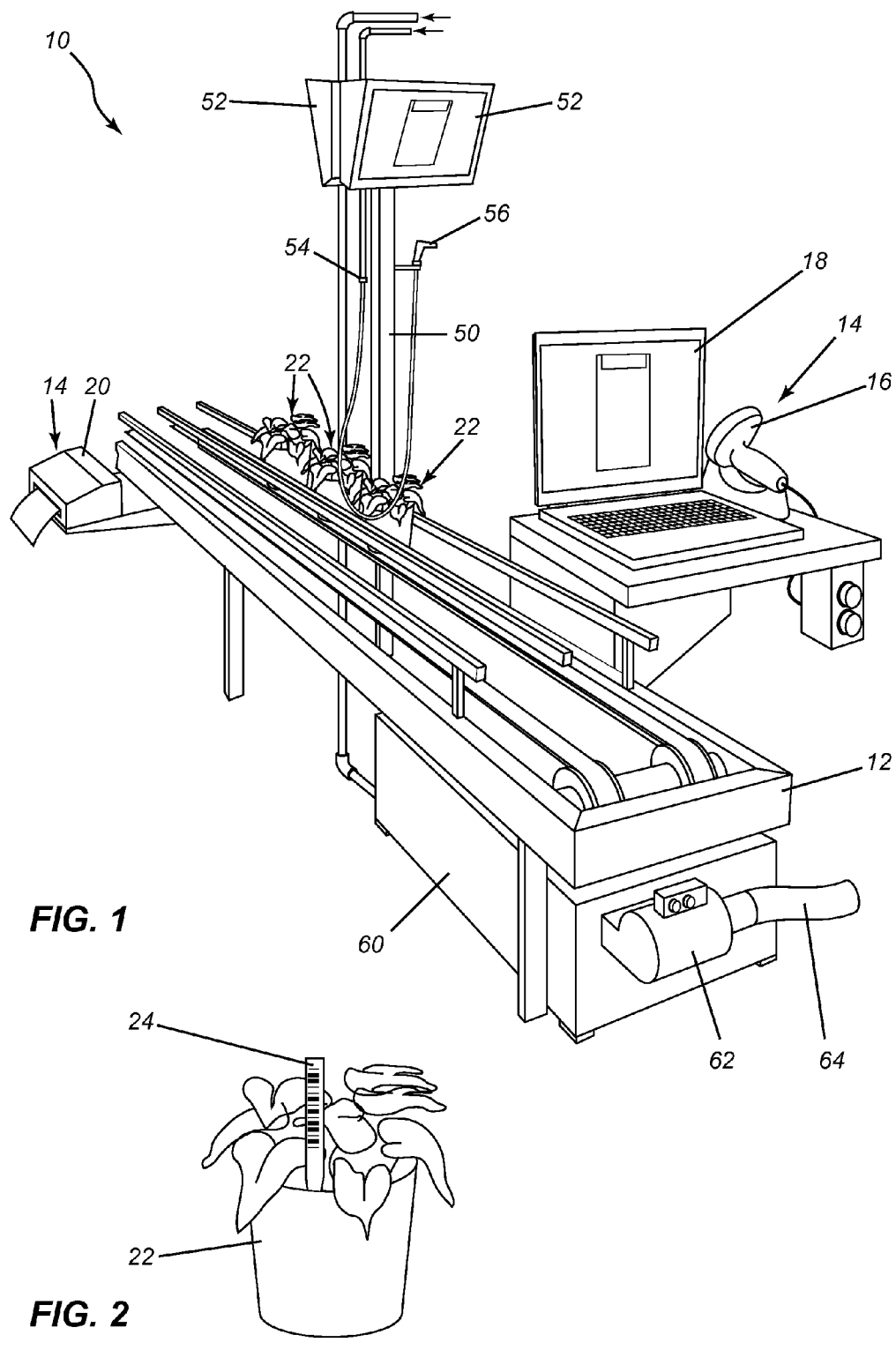
FIG. 1 is a perspective view of an exemplary prepping and tagging system in accordance with one aspect of the present invention.
FIG. 2 is a perspective view of a typical potted plant having a pick tag.

FIG. 1 depicts a plant prepping and tagging system in accordance with a main aspect of the present invention. As depicted in FIG. 1, the plant prepping and tagging system, which is designated generally by reference numeral 10, includes a conveyor 12 (e.g. conveyor belt or chain conveyor). In a preferred embodiment, the conveyor has two parallel chains as shown in FIG. 1. This conveyor is used to convey potted plants past a plurality of worker stations (e.g. a plurality of workers seated on stools along the conveyor) to enable the plants to be individually prepped by workers in an assembly-line fashion. For example, one worker might weed the plant. The next worker might trim the plant. A further worker might clean the plant and the pot. A further worker might insert a stake. Yet a further worker might be tasked with attaching the tag to the stake. As will be appreciated, other prepping operations might be added or some of these operations not performed. It should be appreciated that one worker might be charged with performing two or more of such tasks. The conveyor, however, enables serial and individualized processing and prepping of each plant in an order. This is far more efficient than the traditional approach of prepping the plants on a trailer. In FIG. 1, three plants are shown by way of example on the chain conveyor.

FIG. 1 also illustrates that the system 10 further includes a tag-printing system 14 for printing tags on demand. These tags are affixed to the plants after prepping (i.e. after trimming, weeding, cleaning, etc.). The plants may be, for example, perennials, flowers, shrubs, bushes, small trees, etc. such as the potted plant depicted by way of example in FIG. 2.

As further depicted in FIG. 1, the tag-printing system 14 comprises a barcode scanner 16, a computing device 18 (e.g. a laptop) having an interface (or port) for communicating with the bar code scanner. The computing device is thus capable of receiving data from the barcode scanner via the interface. The barcode scanner may be connected to the computing device via a wired interface, e.g. a USB cable, Firewire® cable or equivalent, or alternatively via a wireless connection, e.g. Bluetooth® or equivalent.

As further depicted in FIG. 1, the tag-printing system includes a printer 20 (e.g. a color thermal printer) connected to the computing device for on-demand printing of tags with high-resolution color images of the plant variety along with plant information, care instructions, customer retail pricing information, bar codes, and other any customized information that the client requests. The printer may be used to print a sheet with multiple tags, e.g. six tags per sheet. The printer prints directly onto plastic sheets that have perforated lines to facilitate detachment of the various tags from the sheets and which are weather-proof so that the print does not smudge or fade in the sun and rain. In another embodiment, this print-on-demand technology may be used to print the tag images on stickers which are then adhered to a simple picture tag or directly to the pots. However, directly printing the tags is believed to be most efficient.

In operation, when an order is placed, the pickers go out to the picking site(s) and pick the prescribed number of plants of the requested variety. The filled order of potted plants of the requested variety is then delivered by cart and trailer to the prepping area (where the conveyor-based prepping and tagging system is located). As illustrated in FIG. 2, one or more of the potted plants 22 has a pick tag 24 inserted into the soil by the picker(s) to indicate what variety of plant it is. Usual practice is to place a single pick tag for a group of plants of the same variety that belong together as part of the same order. This pick tag may display a bar code or equivalent, number of units, and product location. This bar code enables the pick tag to be scanned using a bar code scanner to extract information about the order and to correlate that order with customer information stored on a computer that is part of the tag-printing system 14.

Figure 3:
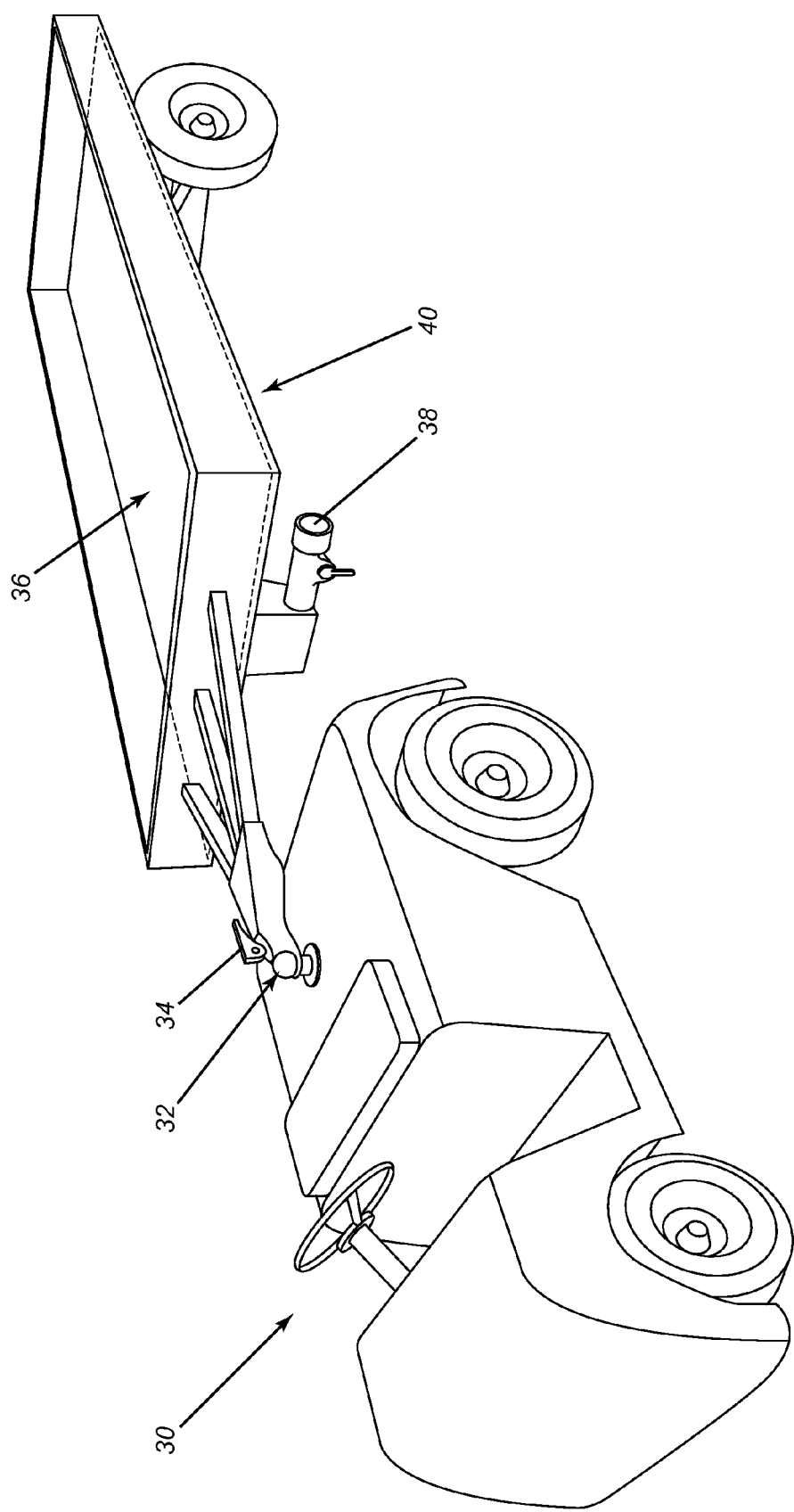
FIG. 3 is a perspective view of a cart towing a novel flood trailer in accordance with another aspect of the present invention.

Picked plants may be delivered to the plant prepping and tagging system using a novel flood trailer 40 towed by a cart that may be electric or gas-powered. An example of such a cart and trailer is illustrated in FIG. 3. A utility cart 30 has a rear-mounted ball for engaging a concave socket extending from a three-member bracket mounted to a front portion of the trailer 40. The ball and socket together form a ball joint 32. A locking clamp 34 is provided to manually lock and unlock the socket onto the ball. The flood trailer 40 includes a water-retention basin 36 (or tub) for holding the water and a water valve 38 that serves as both an inlet and a drain. The water valve 38 is connectable to a hose to pump water into the basin/tub 36 or to drain water from said basin/tub. The water valve 38 may be mounted to a forward portion of the underside of the trailer as shown by way of example in FIG. 3.

As further illustrated in FIG. 1, the plant prepping and tagging system 10 may include a water tank 60, pump 62 and hose 64 for supplying water to the trailer. This hose is provided with a connector or adapter for connecting to the water valve 38 described above.

As further illustrated in FIG. 1, the plant prepping and tagging system may further comprise an upright support 50 member and a pair of display screens 52 mounted to the upright support member via a suitable mounting bracket. These display screens may be used to present information to facilitate tagging and shipping of the plants. The display screen are, in the specific embodiment depicted in FIG. 1, positioned back to the back and angled slightly downwardly for ease of viewing.

The upright member may also optionally include data cable connection, electrical connections and a water outlet 54 connected to a hose and wand (or nozzle) 56 for manually watering the plants.

As shown in FIG. 1, the system may be integrated as a single apparatus with the conveyor mounted to a frame that also supports the printer, computer, upright support member (which in turn supports the computer monitors/display screens). The entire apparatus may be mounted on casters to facilitate displacement. Alternatively, the system may comprise physically separate components, i.e. the laptop and printer tables/shelves and the upright support need not be physically mounted to the frame that supports the conveyor belt.

This novel system enables the performance of two novel methods (processes) related to the processing of plant orders for a nursery, greenhouse or equivalent. In broad terms, the first process is a novel tagging process that exploits print-on-demand technology to compile customized client data and to print customized tags on a just-in-time basis. In other words, the process entails receiving plants, scanning bar code information from a pick tag, printing tags on demand, and then tagging the plants. The second process that is enabled by this novel system is a novel handling/prepping process which can be used with or without the tagging process (although, ideally, both processes shown be used to achieve optimal results). The novel handling/prepping process adopts an assembly-line approach by loading plants on a conveyor and by positioning workers in a line so that each worker can perform one operation on the plant as it travels past that worker's station. Thus, serially arranged workers clean, inspect, trim, weed, and tag the plants. In other words, the process involves receiving the plants, loading the plants onto the conveyor, and then prepping (cleaning, weeding, trimming, etc.) the plants as the plants travel along the conveyor. As noted above, these two processes have synergy when integrated together. Tags are generated based on customer data and printed on demand using the tag-printing system. These tags are then affixed as the plants are conveyed along the conveyor belt.

Figure 4:
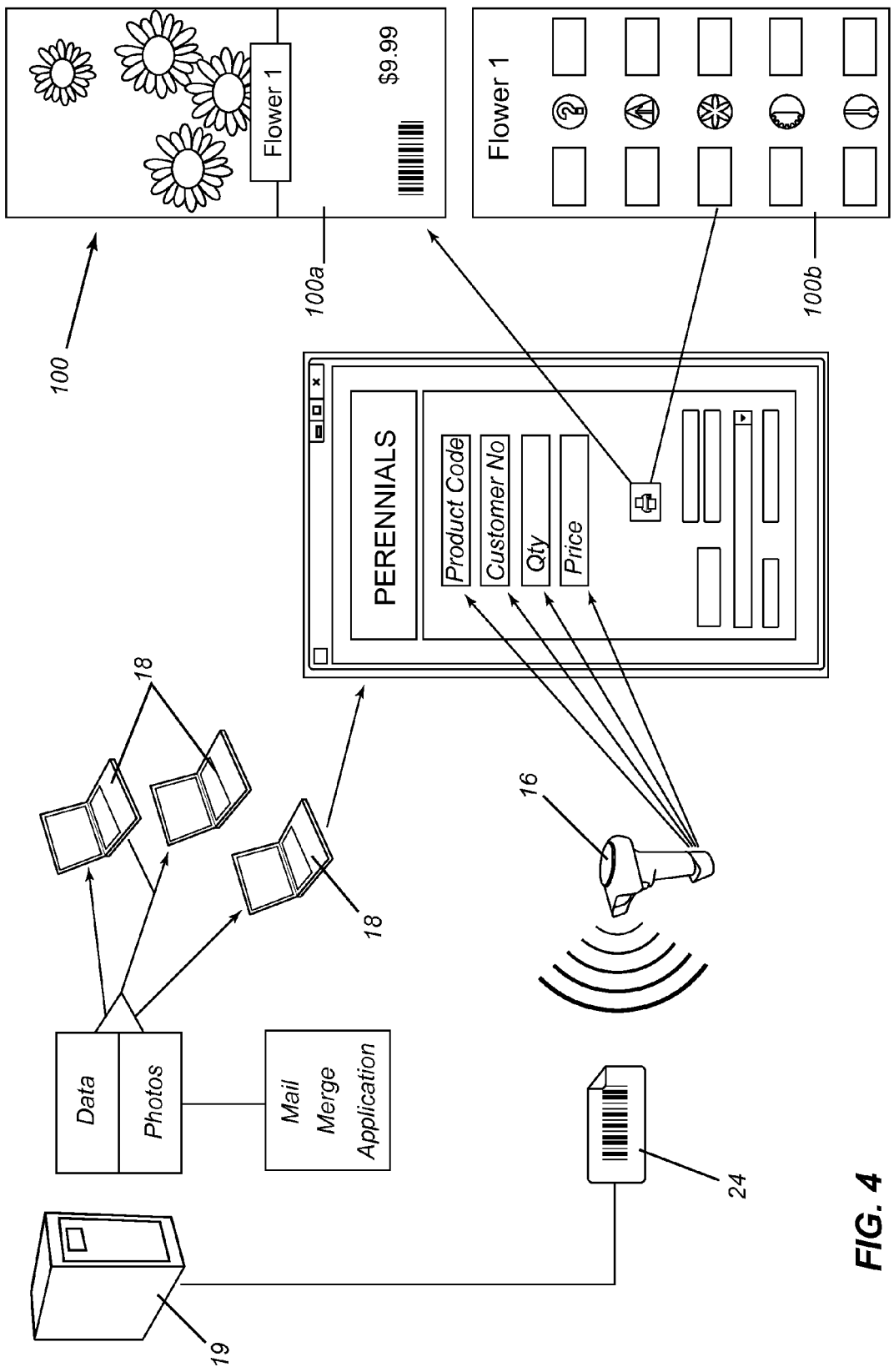
FIG. 4 is a schematic depiction of a data network used in the novel tagging system.

FIG. 4 schematically depicts an example of a computer network that may be implemented for the tag-printing system. This network has a server 19 connected to laptops 18 at each conveyor. The barcode scanner 16, such as the exemplary wireless barcode scanner shown in this figure, scans the barcode information on the pick tag 24 to import data about the picked plants (filled order) into the server to verify that the number and variety of the picked plants delivered to the conveyor in fact matches the customer's order. For example, the information may be encoded using a Code 39 barcode. The pick tags and pick slips are generated from the main order processing center that has the customer number, the product number, the quantity of the product requested for that order, and the customer's price of that product encoded as a Code 39 barcode. The server 19 and/or laptops 18 store customer information, order information, plant information, and barcode information, and may be programmed to generate a tag image for printing two-sided tags by compiling the customer information, order information, plant information and UPC barcode information and by obtaining a digital photo of the plant either from a local or remote photo database. The front has a color picture of the plant while the back can be created for example using a template in MS Publisher by using the mail merge feature to pull data from an MS Excel spreadsheet with the all tag back information. The tag back is laid out upside down in the template so it prints upside down relative to the front image. The programmed macro then creates JPEG copies of each back and saves them into a Backs folder located in a main Photos folder. This is presented solely as one example implementation. Other programs or software tools can be used to accomplish the same result.

In the specific configuration shown in FIG. 4, the server 19 stores the customer data, plant variety data, order data, etc. as well as the photo files for all the plant varieties. A label/tag printing program (application) may present a print label window or dialog box such as the one show in this figure by way of example. This print label window or dialog box shows a number of fields: product code, customer number, quantity, and price. There may be additional fields or fewer fields than what is shown in this example. The print label window provides a user interface element (button, menu, command) to send a print command to the printer to print the tags/labels. As depicted by way of example, this print label window may also include an Update All button, a Hold Print button, a Preview Tag button and a Set Customer Number button. In one embodiment, this tag printing program may be built with MS Access although other applications may be used to achieve the same result.

A server or one of the networked laptops is used to compile the data to produce a two-sided tag such as the tag 100 having front side 100a and back side 100b illustrated by way of example in this figure. The first side 100a of the tag displays the color image and name of the plant variety in question, the retail price, UPC bar code and any other information that the customer has requested. On the second (back) side 100b is printed other information such as plant care instructions, optimal growing conditions (temperature range, sunlight and shade considerations, water requirements, etc) and any other information requested by the customer. The tags can be fully customized for each customer and for each order based on data received from the customer for that particular order. For example, the customer may request an order of a specific variety and indicate a desired retail price. Tags with the desired retail price are printed on demand, thereby providing tremendous flexibility to the customer to vary the pricing of plants according to prevailing market conditions.

In one embodiment, the scanner is programmed to automatically send the information to the tag printing program the moment it reads the scan and then send the print command, with no need to key anything in.

In one embodiment, the scanner sends the barcode information to the tag printing program on the designated laptop and the program then splits the barcode information into the respective fields, and then print command is sent automatically. All fields and the print command can also be typed in manually.

Before a print command is sent to the printer, all fields are checked programmatically to verify that product, customer and pricing information is valid and correct. The automatic verification, correlation and cross-checking of data ensures accuracy in processing the orders. For example, photos drawn the photo database are matched to the product code. The product name is matched from the products table. The UPC barcode is matched from the product or customer tables. The price and customer name are matched from the customer table.

The underlying tables in the program are simply a customer table with each customer's pricing and a product table with an optional order table.

Figure 5:
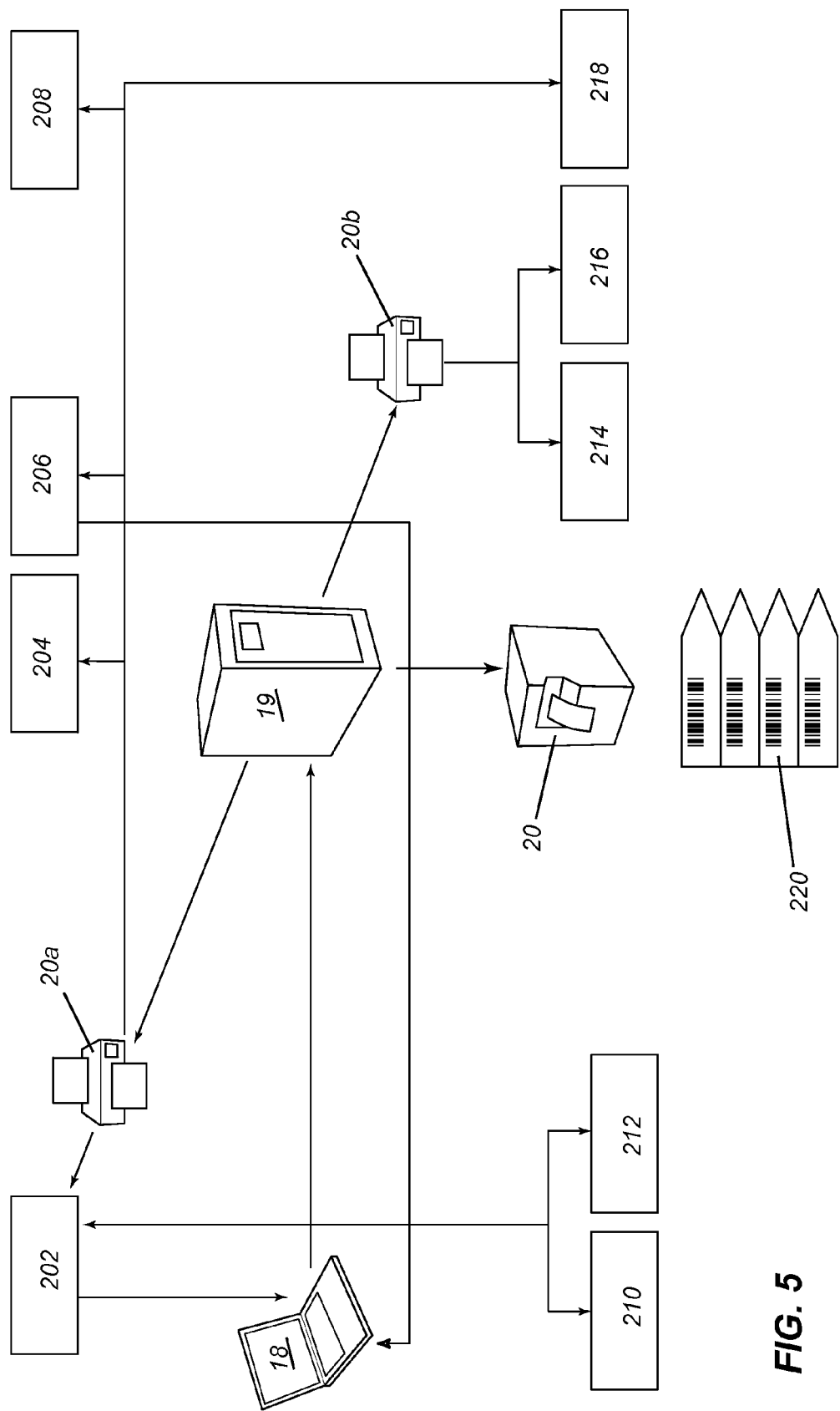
FIG. 5 is a schematic depiction of how the novel tagging process is integrated within the overall process of managing customer orders.

FIG. 5 depicts schematically how the tag-printing system can be integrated into the overall order management system. As shown, the tag-printing system comprises a server 19 networked to a computer (e.g. laptop) 18 stationed at the conveyor and also networked to one or more printers 20a, 20b for printing customer transaction forms and a thermal printer 20 for printing tags.

With the specific network and process shown by way of example in FIG. 5, the product and pre-price form 202 is printed by printer 20a (as a first step). Availability and price list forms 204 are then printed by printer 20a (and then faxed or e-mailed to the customer). The customer fills in the form and returns the filled-in form 206. A final confirmation 208 is then printed by the first printer 20a. Shipper copies 210, 212 are then printed by the first printer 20a. A sheet 220 of stick tags is printed by the thermal printer 20 using data from the server 19. These are the same stick tags that are scanned when the pick-order is completed and brought back to the prepping facility for prepping and full color tagging. The second printer 20b prints an invoice 214 and an office copy 216 of the invoice. Lastly, the first printer 20a prints a delivery form 218.

The considerable advantages relative to the prior art of the novel flood trailer, conveyor-handling system and tag-printing system will now be described below.

Flood Trailer

One aspect of this innovative system and process is an innovative flood trailer for transporting and watering plants. The flood trailer includes a frame having a connection joint for connecting to a cart adapted to tow the trailer, a water-retention basin supported by the frame. The water-retention basin is adapted to receive a volume of water into which plants can be placed for soaking. A water valve is provided to receive a water hose for filling the water-retention basin with water and for draining water from the water-retention basin.

This novel flood trailer helps to overcome many of the problems associated with picking, handling, watering and transporting plants using the traditional techniques described above in the Background. The problems identified by Applicant with this traditional approach are that the conventional tractor was impractical as it required a specially trained driver, and it was loud and created fumes inside a closed area. The conventional tractor was furthermore difficult to manoeuvre (i.e. it could not easily turn or back up). The height and power of the tractor moreover gave rise to safety issues. The ride of a conventional tractor is also rough (bumpy), thereby frequently causing soil to bounce out of pots or the pots themselves to bounce off the trailer being towed by the tractor. The solution to these problems is a novel cart-trailer. The cart may be a standard gas-powered utility cart (e.g. the E-Z-Go™ MPT 1200 by Textron® or any other equivalent cart). The gas cart emits little noxious fumes, is quiet, requires little maintenance, and is easy to manoeuvre. No specially skilled driver is required. The cart can be easily backed up and turned. A safety stop feature prevents pinching or crushing a person between the cart and the trailer. Furthermore, the ride is smooth so that potted plants are not jostled or thrown off the trailer. The cart also provides one or more passenger seats so that pickers or workers can be transported to and from the shipping area to the picking sites.

The novel trailer of this innovative cart-trailer has a water-retention bed (or flood bed) so that the potted plants can be watered from the bottom of the pot instead of top-watering the plants which is inefficient and messy. These novel flood trailers make it easy to water the plants. It is no longer necessary for the workers to strain to reach all the plants with the watering wand. This flood trailer eliminates the need for top watering of the potted plants. Top watering is inefficient as tightly packed plants in the middle of the trailer are easily missed. Pots are thus not watered evenly or consistently. Furthermore, when plants have large leaves, top watering does not always penetrate through to the soil. In other words, with plants having large or broad leaves, the water tends to simply run off the big leaves with little or no water getting into the soil. The unevenness of top watering means variability in the moisture levels in the pots, thus resulting in higher loss rates at the retail level. Yet another disadvantage of top watering is that the leaves of the top-watered plant are wet, making subsequent trimming and prepping more difficult and uncomfortable for the workers. All of these problems associated with top watering are obviated by the adoption of this novel flood trailer having a basin for retaining water so that pots can be seated directly in water, thus permitting the surrounding water to seep directly into the soil inside the pots through the bottoms of the pots. In operation, the trailers are flooded with water and the pots are allowed to sit and soak before they are placed on the conveyor belt for trimming and tagging (processes to be described in greater detail below). Flooding results in even moisture, thus enhancing the overall plant quality, keeps the leaves dry for easier trimming and weeding. The prepping area thus remains drier and cleaner. The process is also faster than top watering. Flood waters can be pre-treated with chemicals (e.g. fertilizers) if desired.

The novel trailer also has a ball joint for connecting to the cart. This ball joint enables the trailer to be pivoted or canted relative to the cart, thus enhancing manoeuvrability and permitting the cart to be tilted for clean-out.

The novel flood trailer thus facilitates the picking, handling, transporting and watering of plants. Once the plants arrive at the prepping/shipping area from the pick sites, the next step is to the prep the plants. Prepping the plants involves cleaning, trimming, weeding and tagging. As noted in the Background, the traditional approach was to clean, trim, weed and tag the plants while they remained in their trailer. This was physically awkward for the workers as they often had to strain to reach plants in the middle of the trailer. Because the pots were packed together on the trailer, workers were frequently unable to fully see each and every pot and plant. Thus, quality control remained a persistent problem. The traditional method was labour-intensive as it required workers to move around the trailer to prep and clean plants and pots. With plants sitting on trailers, this used up a lot of floor-space, thus preventing other orders from being processed and delivered.

Handling System

A second main aspect of this innovative system and process is a novel plant-handling system that employs a chain conveyor to enable plants to be prepped one by one in single file as they are conveyed along the chain conveyor. In operation, plants are unloaded from the flood trailer unto this conveyor belt for trimming, cleaning, weeding and tagging operations. In one specific embodiment, the conveyor can be a chain conveyor designed to accommodate single pots such as one-gallon, two-gallon, five-gallon sizes as well as flats (6×1 gallon) to be individually inspected, prepped and tagged. This conveyor thus provides the workers with much better access to the plant and also much better visibility of the plant. This means better quality control in terms of weeding, trimming, cleaning, tagging, etc. This also speeds up the processing of plants. The improved process also reduces safety concerns as the workers no longer need to walk around the trailers and moving tractors (the workers may remain comfortably seated in one safe spot while the plants pass by one by one on the conveyor). The improved access to the plants and improved visibility of the plants also means that workers have an easier time sticking tag holders into the pots and attaching the plant/pricing tags. The workflow is thus constant with no hold-ups, thereby saving time and labour. The conveyor belt may be variable speed to accommodate different workforces and prepping requirements. Also, the conveyor may be reversible. The conveyor is also equipped with an automatic stop. When pots back up at the end of the belt, for whatever reason, the conveyor belt stops automatically to prevent more pots from being loaded onto the belt. This eliminates the need for close supervision and manual control of the belt, and reduces the likelihood that pots are crushed or otherwise damaged when they are forced into one another by the moving belt.

This novel plant-handling system and process provide many advantages over the traditional method. As noted above, by placing the plants on the conveyor, they are easier to inspect and prep. The conveyor delivers the plants to the workers who can individually perform sequential operations on the plant as it passes each respective worker station. For example, one worker can trim the plant, another worker can weed, yet another can clean, and yet a further worker can tag. This conveyor creates effectively an assembly-line approach to plant prepping which is far more efficient than the traditional approach of prepping plants in a trailer. This novel plant-handling system and process provide other advantages as well. For example, the system is very easy to operate, thus requiring only a fairly low level of worker skill. It is thus easier to train new workers or to get temporary help for the busy season. The conveyor emits only a minimal amount of noise and can be electrically powered so there are no fumes or exhaust. This system and process thus improves shipping time and the accuracy and quality of shipments since the conveyor makes it easy to identify and replace incorrectly picked plants or plants in poor condition. This system and process also improves the accuracy of pot counts and improves the tracking and identifying of plant substitutions. Thus, the individual prepping of plants along the conveyor is a radical improvement over the traditional method of prepping a mass of pots crammed together on a trailer.

The system may optionally include one or more additional watering wands attached to a water supply to enable supplemental watering, as may be required.

As will be appreciated, a plurality of parallel conveyors may be employed simultaneously in the same prepping station. For example, a set of parallel conveyors can be used to process different orders of plants contemporaneously. While it is preferred to employ a single conveyor for all prepping operations (trimming, weeding, cleaning, tagging) for a given order, it is also possible to use two or more serial conveyors arranged end-to-end whereby certain operations are performed on a first conveyor which then deliver the plants to a second conveyor for further processing and prepping. Therefore, the novel plant-handling system of the present invention is not limited to a single conveyor.

The novel system and process enables continuous unloading to waiting racks. These racks are placed on either side of the conveyor and are continuously filled and replaced. Accordingly, there is a general improvement in speed and processing efficiency. Orders can thus be processed and shipped more rapidly than was previously possible using the conventional approach. Because of this increased productivity at the prepping station, transport trucks can be loaded with multiple orders for multiple destinations, for greater shipping efficiency.

Tagging System

Using this novel system and process, the plants are individually tagged as they travel along the conveyor belt. Traditionally, as noted above in the Background, these tags were pre-ordered. Applicant has recognized that pre-ordering batches of tags is highly inefficient. For example, tags were sometimes ordered for plants that may not survive production. Estimating how many tags will be required is always problematic since the nursery may end up with more or less of one variety than originally planned. Ordering an insufficient number of tags means that some plants cannot be properly tagged. On the other hand, ordering too many tags is wasteful, both in terms of the cost of the tags and their shipment to the prepping facility but also in terms of storage space at the prepping facility. Storage of thousands of tags takes up valuable space inside the prepping facility. Another problem that arose is that the printing company from whom the tags were ordered did not always have the ability to provide the nursery with pre-printed tags for new varieties to the marketplace. As a further complication, in perennial production, approximately 35% of varieties are being dropped each year, leaving the nursery with tags that are no longer useful.

To accommodate customers' requests, manual stickers still have to be applied to each individual tag for displaying information such as customer name, retail price, UPC code, bar code, SKU, logo, etc. Applying these customized stickers to individual tags is tedious and labour-intensive. This traditional process is also prone to error since stickers may be affixed to the wrong tags or the wrong pre-pricing stickers may be used when processing multiple orders. Such errors are especially likely during the busy spring season. Errors were also occurring when processing substitutions (i.e. when pickers had the original tags pulled but the variety was substituted). These changes would result in a trip back to the tag inventory room to hunt for the new tag to replace the old tag. This wasted time, tags, and stickers.

Using this traditional process, once a customer order is placed, the correct number of tags had to be retrieved from the tag inventory. An estimated two hours per day were being wasted (at a typical large nursery) in sorting out tags and matching tags with orders. Additional time was lost affixing the stickers to the tags. If tags ran out, plants could not be shipped. Furthermore, if pre-ordered tags contained errors, the whole batch had to be discarded and new tags ordered.

In view of these various shortcomings, the traditional process suffered from low productivity because of the likelihood of error.

These problems have now been overcome by using a novel print-on-demand tagging system. This novel tagging system is depicted in FIG. 1 and FIG. 2. The system includes a computer network having a printer adapted for two-sided printing of labels on plastic tags. These printed tags may include a photo, a logo, pricing information, plant specifications, care instructions, desired soil and shade conditions, etc.).

Using this novel tagging system, tags are printed in-house on a just-in-time basis to match current orders. This tagging subsystem therefore enables onsite printing of tags using fully customizable data and up-to-date photos in one seamless process. This novel tagging system reduces labour costs, eliminates tag inventory and related tag storage issues, and improves overall efficiency and productivity. Ensuring that information on the tags is accurate and up-to-date is easier with this print-on-demand system as any errors be quickly corrected if found, thereby ensuring that the processing of plants resumes expeditiously.

The novel process initiates when a customer places an order. The pickers are given the order to pick and assemble the plants based on specified variety and count. Once an order is filled with plants and perhaps some plant substitutions, the trailer is brought to the shipping area (as was described above). The trailer is flooded with water and while the plants are soaking the plants' pick tag (usually one such tag per group of plants of the same variety) is scanned using a bar code scanner.

Additional information is retrieved from the program software application, i.e. customer name, SKU, bar code, UPC code, pre-pricing information, logos, etc. The software application may be an MS Access-based program. The program runs the printing machine which produces the correct number of tags per variety on the order with any customized information for that client's order. Robust printers and networked computers are provided to ensure continued performance under either dusty or humid conditions. The computer memory interacts with the program to store SKU's, customer names, customer-specific pre-pricing lists, shipping locations, bar codes, plant photos, UPC codes, logos and plant-specific care instructions.

While the plants travel along the conveyor as described above, a worker places tag holders (i.e. tag-holding stakes or tag-holding sticks) onto the pot for each plant. The printed tags are then affixed to each holder (i.e. to each stake or stick). These tags are printed only as needed based on the most up-to-date customized customer data for each individual order. This process results in less waste, fewer mistakes, diminished cost and an overall improvement in productivity and efficiency.

The tags can be printed from any type or size of paper but a plasticized (plastic-coated or plastic sheets) picture tag print stock pre-perforated for attaching to the holder/stake/stick is preferred to ensure durability, resistance to tearing and fading in the sun as well as resistance to rain and moisture. Multiple tags per page can be printed using, for example, standard-size 8½ by 11 print stock sold under industry code number HT28355-CL5-6). An Okidata C9650 printer has been found to work ideally with this print stock and under the variable operating conditions (ranging from dusty to humid) of a typical plant-prepping facility.

The conveyor system and tagging system may be mounted optionally on casters for easily displacing the systems for maintenance and cleaning. The conveyor and tagging systems are easy to assemble or disassemble as they utilize easily connectable electrical lines, waterlines, and data cables.

As shown in the figures, the system may include two large overhead display screens or monitors to display each order with what is to be printed on the tag (e.g. customer name, plant variety, number of plants to be shipped, SKU, bar codes, etc.) The displays will also indicate where the order is to be loaded, i.e. which transport truck or trailer, which loading dock, whether the racks are wood or steel, the deadline for shipping and a clock display.

The database of high-resolution plant photos may be stored digitally on any computer or memory device connected to the network, preferably stored locally for greater access speed. In one implementation of this technology, the photos can be pulled from a remote server. In other words, the computer, server or other computing device used to print the tags may be configured to communicate with a remotely located storage medium for retrieving a digital photo of each plant that is to be printed on the tags. Therefore, custom on-demand printing of tags can be done using photos that are either stored locally or stored remotely. Thus, as long as the system has access to a database of plant photos, these can be used with the present invention to print tags on-demand.

The embodiments of the invention described above are intended to be exemplary only. As will be appreciated by those of ordinary skill in the art, to whom this specification is addressed, many obvious variations can be made to the embodiments present herein without departing from the spirit and scope of the invention. The scope of the exclusive right sought by the applicant is therefore intended to be limited solely by the appended claims.

The invention claimed is:

1. A plant prepping and tagging system comprising:
a conveyor operable to convey plants past workers positioned along the conveyor in an assembly line fashion, wherein the workers individually prep the plants on the conveyor as needed to be suitable for delivery to a customer, and wherein the plants form an order to be filled for the customer;
a barcode scanner operable to read a barcode attached to at least one of the prepped plants while the prepped plants are being moved on the conveyor;
a thermal tag-printer operable to print tags on demand in response to the barcode scanner reading the barcodes attached to at least one of the prepped plants, and wherein the workers tag the plants using the printed tags;
wherein the plant prepping and tagging system further comprises a server networked to a computing device stationed at the conveyor, wherein the server is networked to the thermal printer, wherein the server is also networked to a printer operable to print a plurality of customer transaction forms comprising order information in response to operation of the conveyor, barcode scanner, and thermal tag printer of the plant prepping and tagging system;
wherein the system comprises a means for soaking the plants in water prior to being conveyed, and wherein the plants comprise potted plants.

2. The system as claimed in claim 1 further comprising a trailer towed by a cart for delivering a plurality of picked plants to the conveyor, the trailer having a water-retention basin for holding a volume of water into which plants be placed for soaking.

3. The system as claimed in claim 2 further comprising a water tank, pump and hose for supplying water to the trailer.

4. The system as claimed in claim 1 further comprising:
an upright support member;
a pair of display screens mounted to the upright support member, the display screens presenting information to facilitate tagging and shipping of the plants.

5. The system as claimed in claim 4 wherein the upright support member comprises a water outlet connected to a watering wand for manually watering plants.

6. The system as claimed in claim 1 wherein the barcode scanner comprises a wireless interface and wherein the computing device is wireless-enabled for wirelessly receiving data from the barcode scanner.

7. The system as claimed in claim 1 wherein the computing device is configured to communicate with a remotely located storage medium for retrieving a digital photo of each plant that is to be printed on the tags.

8. The system as claimed in claim 1 wherein the computing device stores customer information, order information, plant information and barcode information, and is programmed to generate a tag image for printing on the tags by compiling the customer information, order information, plant information and barcode information and by obtaining a digital photo of the plant.

9. A process for handling, prepping, and tagging plants, the process comprising:
receiving picked plants on a trailer, the plants being picked by workers corresponding to an order to be filled for a customer;
soaking the picked plants in a water retention basin mounted on the trailer;
transporting the soaking plants via the trailer to a plant prepping and tagging system;
placing the soaked plants on a conveyor of the plant prepping and tagging system;
manually prepping the plants to be suitable for delivery to the customer via the workers arranged along the conveyor as the plants move on the conveyor;
scanning barcodes on the soaked plants with a barcode scanner while they move on the conveyor;
printing tags with a printer on demand in response to information obtained from the scanning of the barcodes;
manually tagging the plants with the printed tags via the workers;
printing customer transaction forms comprising order information in response to the scanning, printing, and manually tagging, wherein the plants comprise potted plants, and wherein at least the printer and scanner are networked together.

10. The process as claimed in claim 9 further comprising:
loading the picked plants onto the conveyor; and
prepping the plants as the plants travel along the conveyor.

11. The process as claimed in claim 10 wherein prepping includes trimming, weeding and cleaning the plants.

12. The process as claimed in claim 10 wherein the step of tagging comprises:
inserting a tag-holding stick into the soil of each plant as each plant is conveyed along the conveyor;
affixing each tag to each respective tag-holding stick as each plant is further conveyed along the conveyor.

* * * * *